(12) United States Patent
Fukuyama et al.

(10) Patent No.: US 6,519,406 B1
(45) Date of Patent: *Feb. 11, 2003

(54) THERMALLY FUSED INTEGRAL FERRULE AND ITS MANUFACTURING METHOD, AND FIBER ARRAY MANUFACTURING METHOD

(75) Inventors: Masashi Fukuyama, Komaki (JP); Kazutoshi Tohyama, Nakatsugawa (JP)

(73) Assignees: NGK Insulators, Ltd., Nagoya (JP); NGK Optoceramics Co., Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/217,507

(22) Filed: Dec. 21, 1998

(30) Foreign Application Priority Data

Dec. 26, 1997 (JP) .............................. 9-361385
Dec. 18, 1998 (JP) ............................ 10-360445

(51) Int. Cl.⁷ .................................. G02B 6/00
(52) U.S. Cl. ..................................... 385/137
(58) Field of Search ................ 385/137, 65, 83, 385/85, 89, 92; 428/34, 167, 172, 192, 212; 156/109, 89, 11; 65/36, 41, 406

(56) References Cited

U.S. PATENT DOCUMENTS

| | | | | |
|---|---|---|---|---|
| 4,900,118 A | * | 2/1990 | Yanagawa et al. | 350/96.15 |
| 5,377,289 A | | 12/1994 | Johnson et al. | |
| 5,528,719 A | | 6/1996 | Yamada | |
| 5,555,127 A | * | 9/1996 | Abdelkader et al. | 359/341.1 |
| 5,889,914 A | * | 3/1999 | Gentsu | 385/137 |
| 6,103,344 A | * | 8/2000 | Ota et al. | 428/172 |

FOREIGN PATENT DOCUMENTS

| | | |
|---|---|---|
| EP | 0 405 620 A2 | 1/1991 |
| EP | 0 573 288 A2 | 12/1993 |
| EP | 0 611 142 A1 | 8/1994 |
| EP | 0 631 162 A1 | 12/1994 |
| EP | 0 678 486 A2 | 10/1995 |

* cited by examiner

Primary Examiner—Frank G. Font
Assistant Examiner—Tu T. Nguyen
(74) Attorney, Agent, or Firm—Burr & Brown

(57) ABSTRACT

There is provided a thermally fused integral ferrule in which a first glass substrate is at least partly unitarily combined with a second glass substrates by means of thermal fusion. The first glass substrate includes optical-fiber fixing V-shaped grooves on its side opposed to the second glass substrate, and also includes on the optical-fiber fixing V-shaped grooves in the first glass substrate, a guide section having a predetermined void between the first and second glass substrates. The thermally fused integral ferrule is manufactured by contacting the surface to be thermally fused of the first glass substrate in which the optical-fiber fixing V-shaped grooves are formed, with the surface to be thermally fused of the second glass substrate, followed by thermal fusion of the surfaces of the first and second glass substrates at a temperature of $(T_{g1}-100)$ to $(T_{g2}+150)°$ C. (where $T_{g1}$ is the glass transition temperature of one of the first and second glass substrates that is higher than that of the other and $T_{g2}$ is the lower glass transition temperature).

11 Claims, 5 Drawing Sheets

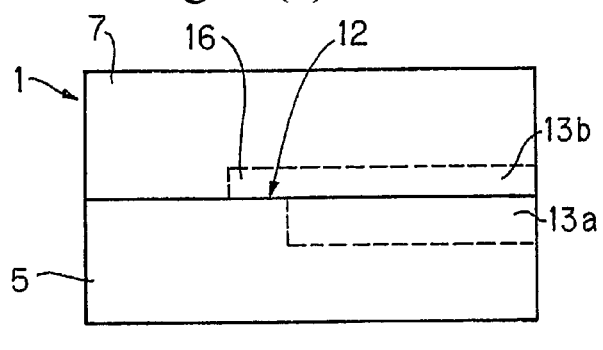
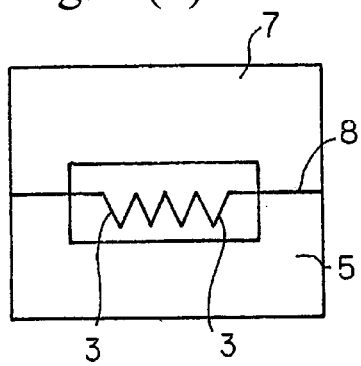
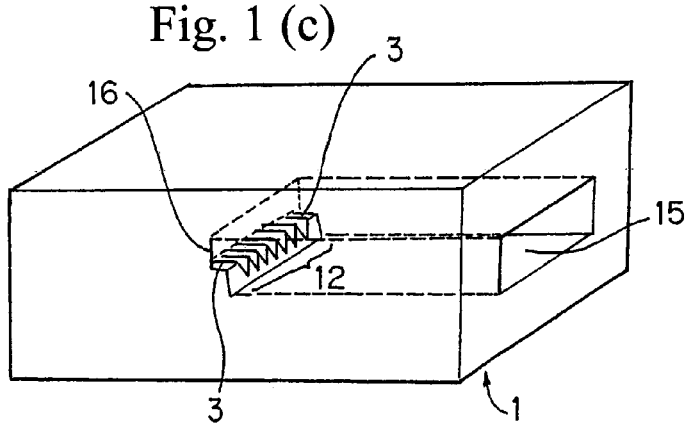
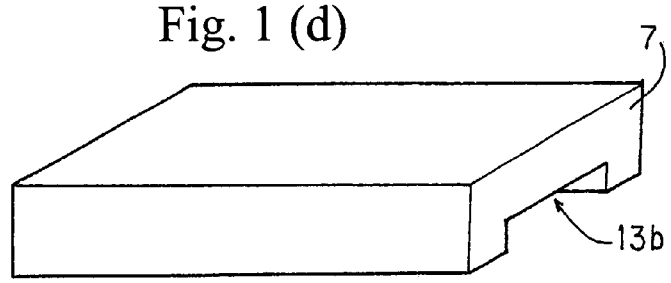
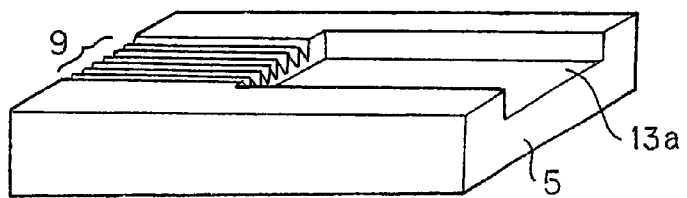

THERMALLY FUSED INTEGRAL FERRULE AND ITS MANUFACTURING METHOD, AND FIBER ARRAY MANUFACTURING METHOD

BACKGROUND OF THE INVENTION AND RELATED ART STATEMENT

The present invention relates to a thermally fused integral ferrule and its manufacturing method, and a fiber array manufacturing method using the thermally fused integral ferrule.

Fiber alignment parts include fiber arrays that connect optical parts such as quartz waveguides to fibers; and MT connectors that connects fibers together.

The material of the fiber array is generally glass or silicon due to the low thermal expansion coefficient of the connected optical part, for example, a waveguide. Inexpensive quality glass materials have recently been developed, so glass is now the main material of the fiber array.

In a conventional resin assembled fiber array using V-shaped grooves, fibers are mounted on V-shaped grooves in a V-shaped groove substrate, pressed against the grooves by a fiber presser substrate, and stuck and fixed thereto with resin. By setting the depth of the V-shaped grooves so that the heads of the fibers protrude from the top of the V-shaped grooves and pressing the heads using the fiber presser substrate, the fibers can each be contacted accurately with the respective V-shaped groove at two points and can thus be arranged accurately.

Since the fibers, V-shaped groove substrate, and fiber presser substrate are simultaneously stuck and fixed together, these components are generally assembled using a resin adhesive that provides an excellent operability.

In the long run, however, the use of the adhesive may cause the stuck portion between the V-shaped groove and fiber presser substrates to be degraded when an environmental condition such as humidity or heat changes.

In addition, since the fiber presser substrate is mounted on the V-shaped grooves, the substrates must be aligned, but this operation is complicated and requires high costs.

Furthermore, since the fiber contacts each V-shaped groove at two points, the accuracy of the arrangement of the fibers after assembly depends on the accuracy of the V-shaped grooves. This accuracy, however is also affected by a difference in fiber diameter (for example, in a 16-fiber array, the difference in diameter among all the 16 fibers).

In view of this point, to maintain long-term reliability, attempts have been made to metallize the substrates so as to use solder for adhesion. In this case, however, the high operating temperature and fluidity of solder makes assembly very difficult, stress may be caused by a difference in thermal expansion between the metallized substrates and glass, and the cost of the solder is high.

Furthermore, a technique for solving the problem associated with the alignment between the V-shaped groove substrate and the fiber presser substrate is known wherein the V-shaped grooves are sized to allow each fiber to sit within the respective groove instead of contacting each groove at two points, wherein the V-shaped groove and fiber presser substrates are stuck together with resin prior to the insertion of the fibers so that the fibers can be later inserted between them. If an adhesive or solder is used to stick the substrates together, a problem similar to that described above may occur.

As shown in FIG. 7, a connector 30 in which normal 125-$\mu$m fibers are arranged at a 250-$\mu$m pitch is generally used as an MT connector, wherein optical fiber insertion holes 36 are formed at a 250-$\mu$m pitch. Optical fibers are inserted into the optical fiber insertion holes 36, and the holes are formed with a very strict clearance in order to arrange the fibers accurately. The holes are about 127 $\mu$m for the normal 125-$\mu$m optical fibers. It is very difficult to insert optical fibers into these holes, so 250-$\mu$m pitch semicircular guide grooves 32 are provided to allow optical fibers to be inserted efficiently. The guide grooves 32 are continuously joined with the optical fiber insertion holes 36 via conical tapers 34 to allow optical fibers to be inserted easily.

Thus, resin injection-molded connectors that are normally inexpensive and provide a high dimensional accuracy have generally been used as MT connectors. Since, however, such a connector is composed of resin, it is not optimal for connection with, for example, a quartz waveguide due to its high thermal expansion.

Consequently, the MT connector is desirably formed of glass, but it is conventionally difficult to form a plurality of circular holes in glass using the arrangement accuracy of the MT connector. As a result, this technique has not been industrially realized.

SUMMARY OF THE INVENTION

The present invention is provided in view of this conventional problem, and its object is to provide an inexpensive ferrule that has high junction strength, watertightness, and productivity, and its manufacturing method, as well as a fiber array manufacturing method.

This invention provides a thermally fused integral ferrule in which a first glass substrate is at least partly combined with a second glass substrate unitarily by means of thermal fusion, wherein the first glass substrate includes optical-fiber fixing V-shaped grooves on its side opposed to the second glass substrate and also includes on the optical-fiber fixing V-shaped groove in the first glass substrate, a guide section having a predetermined void between the first and second glass substrates.

According to this invention, the maximum surface roughness (Rmax) of the internal surfaces of the first and second glass substrates is preferably between 0.2 and 2.0 $\mu$m, and the area of the surface to be thermally fused of each of the first and second glass substrates is preferably 0.01 mm$^2$ or more.

In addition, this invention provides a method for manufacturing a thermally fused integral ferrule comprising: contacting a surface to be thermally fused of a first glass substrate in which optical-fiber fixing V-shaped grooves are formed with a surface to be thermally fused of a second glass substrate, and thermally fusing said surfaces of the first and second glass substrates at a temperature of (Tg1−100) to (Tg2+150)° C. (where Tg1 is the glass transition temperature of one of the first and second glass substrates that is higher than that of the other and Tg2 is the lower glass transition temperature).

Moreover, this invention provides a method for manufacturing a thermally fused integral ferrule, comprising forming a film of a glass frit on a surface to be thermally fused of a first glass substrate in which optical-fiber fixing V-shaped grooves are formed or on a surface to be thermally fused of a second glass substrate, contacting the surfaces of the glass substrates together, and thermally fusing the surfaces of said glass substrates at a temperature of (Tg3) to (Tg4+150)° C. (where Tg3 is the glass transition temperature of the glass frit and Tg4 is the glass transition temperature of the first glass substrate).

According to this manufacturing method, the maximum surface roughness (Rmax) of the surface to be thermally fused of each of the first and second glass substrates is preferably 0.5 µm or less.

Moreover, this invention provides a fiber array manufacturing method using the thermally fused integral ferrule, comprising following the steps (a)–(e):

(a) arranging the tips of optical fibers over the guide section on the optical-fiber fixing V-shaped grooves;

(b) lowering the tips of the optical fibers onto the optical-fiber fixing V-shaped grooves;

(c) inserting the optical fibers into the thermally fused integral ferrule while allowing the optical-fiber fixing V-shaped grooves to guide the tips of the fibers; and (d) applying and filling a first liquid adhesive to and in the entire thermally fused integral ferrule;

(e) solidifying the first liquid adhesive.

If a thermally fused integral ferrule is used in which the second glass substrate is thermally fused in such a way that there is an open space over the guide section on the optical-fiber fixing V-shaped grooves in the first glass substrate while only the optical-fiber fixing V-shaped grooves are covered, the fiber array manufacturing method desirably comprises the following steps (f) and (g) subsequent to the step (e):

(f) covering a covered optical fiber with a second liquid adhesive; and (g) solidifying the second liquid adhesive.

In addition, according to the fiber array manufacturing method, it can have prior to the step (a) the step of applying a liquid adhesive to the optical-fiber fixing V-shaped grooves in the first glass substrate or to the optical fibers.

BRIEF DESCRIPTION OF THE DRAWINGS

FIGS. 1(a), (b), (c), and (d) show one embodiment of a thermally fused integral ferrule according to this invention showing its basic structure. FIG. 1(a) is a schematic front view, FIG. 1(b) is a right side view, FIG. 1(c) is a perspective view, and FIG. 1(d) is an exploded perspective view.

FIGS. 2(a) and (b) show another embodiment of a thermally fused integral ferrule according to this invention showing its basic structure. FIG. 2(a) is a schematic front view and FIG. 2(b) is a right side view.

FIG. 3(a) is a perspective view.

FIG. 4(a) is a perspective view.

FIG. 5(a) shows V-shaped grooves.

DETAILED DESCRIPTION OF PREFERRED EMBODIMENT

Figure 2:
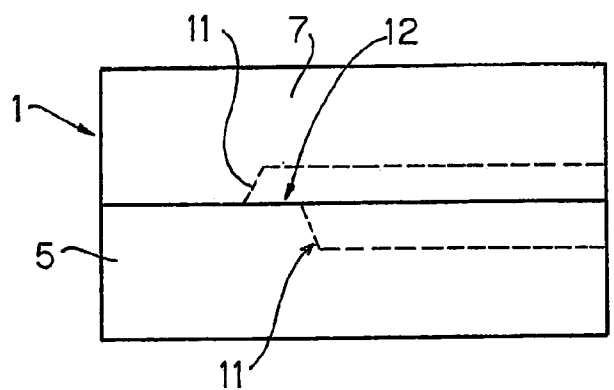
Figure 2:
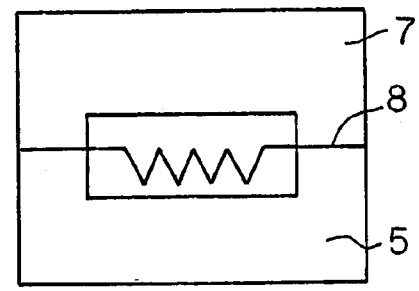

Embodiments of this invention are described below in detail based on drawings.

FIGS. 1(a), (b), (c), and (d) show one embodiment of a thermally fused integral ferrule according to this invention showing its basic structure. FIG. 1(a) is a schematic front view, FIG. 1(b) is a right side view, FIG. 1(c) is a perspective view, and FIG. 1(d) is an exploded perspective view.

In FIGS. 1(a), (b), (c), and (d), a thermally fused integral ferrule 1 is obtained by using thermal fusion to unitarily combine a first glass substrate 5 having a covered-optical-fiber fixing groove 13a and optical-fiber fixing V-shaped grooves 9 with a second glass substrate 7 having a covered-optical-fiber fixing groove 13b that is complementary with the covered-optical-fiber fixing groove 13a in the first glass substrate 5 and a void 16 that constitutes an optical-fiber guide section 12 with part of the optical-fiber fixing V-shaped grooves 9 in the first glass substrate 5.

This configuration allows the thermally fused interface 8 between the first and second glass substrates 5 and 7 to have a larger area to improve reliability because the surface of the first glass substrate 5 excluding the covered-optical-fiber fixing grooves 13a, 13b and the void 16 and the whole surface of the second glass substrate 7 are surfaces to be thermally fused.

In addition, by providing a taper 11 on the optical fiber guide section 12 as shown in FIGS. 2(a) and (b), optical fibers can be inserted more appropriately, and 5 damages such as disconnection of the optical fibers at the edge of each optical-fiber fixing V-shaped groove 9 can be reduced or avoided.

Moreover, since the covered-optical-fiber fixing grooves 13a and 13b form a covered-optical-fiber housing section 15, the optical fibers can be inserted straight into the optical-fiber fixing V-shaped grooves 9, while a covered optical fiber can be reliably fixed to the ferrule.

In the thermally fused integral ferrule 1 in FIGS. 1(a), (b), (c), and (d), it is slightly difficult to maintain the positional accuracy between the first and second glass substrates 5 and 7 during thermal fusion, so the covered-optical-fiber housing section 15 must be supersonically processed to prevent the covered optical fiber from being damaged during insertion. Accordingly, this ferrule 1 requires slightly higher costs.

Figure 3:
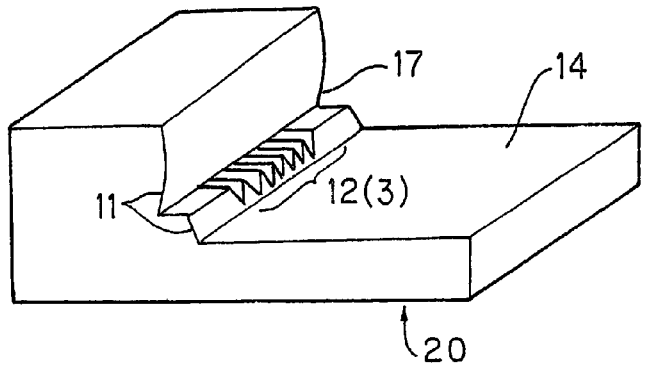
FIGS. 3(a), (b), and (c) show another embodiment of a thermally fused integral ferrule according to this invention.
FIG. 3(b) is an exploded perspective view.
FIG. 3(c) is an explanatory sectional drawing showing that optical fibers are inserted into the ferrule (a fiber array).
Figure 3:
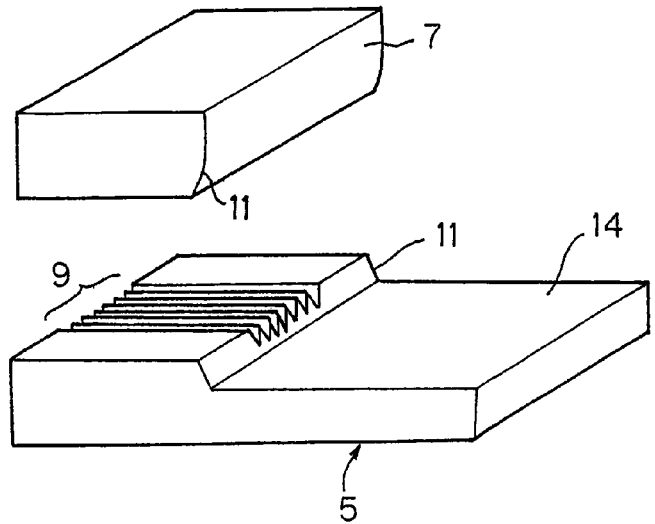
Figure 3:
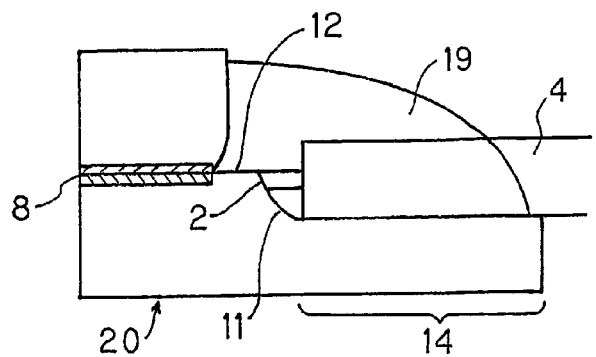

To solve the problem in FIGS. 1(a), (b), (c), and (d), a thermally fused integral ferrule, which is shown in FIGS. 3(a), (b), and (c) and 4(a), (b), and (c), is preferable.

FIGS. 3(a), (b), and (c) show another embodiment of a thermally fused integral ferrule according to this invention. FIG. 3(a) is a perspective view, FIG. 3(b) is an exploded perspective view, and FIG. 3(c) is an explanatory sectional drawing showing that optical fibers are inserted into the ferrule (a fiber array).

In this embodiment, a thermally fused integral ferrule 20 is obtained by using thermal fusion to unitarily combine a first glass substrate 5 having a covered-optical-fiber support section 14 and optical-fiber fixing V-shaped grooves 9 with a second glass substrate 7 having an open portion 17 that constitutes an optical-fiber guide section 12 with part of the optical-fiber fixing V-shaped grooves 9 in the first glass substrate 5.

Compared with the thermally fused integral ferrule 1 shown in FIGS. 1(a), (b), (c), and (d), the thermally fused interface 8 between the first and second glass substrates 5 and 7 can be minimized to improve the dimensional accuracy of the optical-fiber fixing V-shaped grooves 9.

In addition, due to its stepped structure, the first glass substrate 5 can be simply formed by means of grinding and can simplify the structure of the ferrule to reduce costs.

In the thermally fused integral ferrule 20, since covered-optical-fibers 4 are simply supported by the covered-optical-fiber support section 14, a certain means is required to insert the optical fibers 2 straight into the optical-fiber fixing V-shaped grooves 9. In addition, if the ferrule 20 is unitarily combined with the covered optical fiber 4 as shown in FIG. 3(c), an adhesive 19 that can withstand bending must be used to firmly fix the ferrule 20 and the covered optical fiber 4 together.

Figure 4:
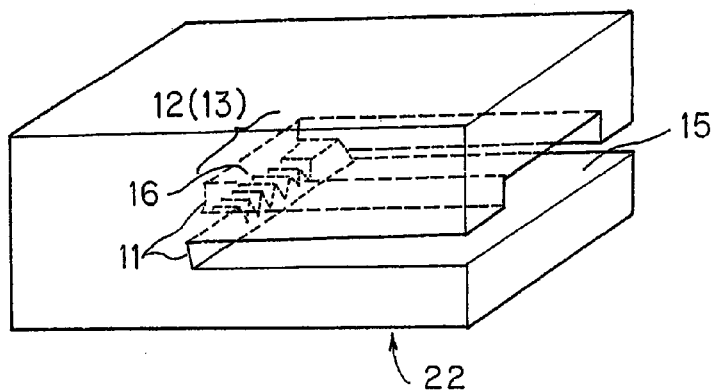
FIGS. 4(a), (b), and (c) show yet another embodiment of a thermally fused integral ferrule according to this invention.
FIG. 4(b) is an exploded perspective view.
FIG. 4(c) is an explanatory sectional drawing showing that optical fibers are inserted into the ferrule (a fiber array).
Figure 4:
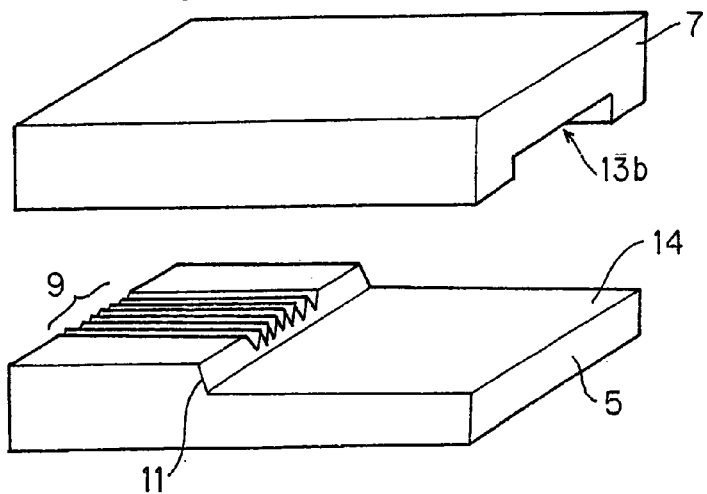
Figure 4:
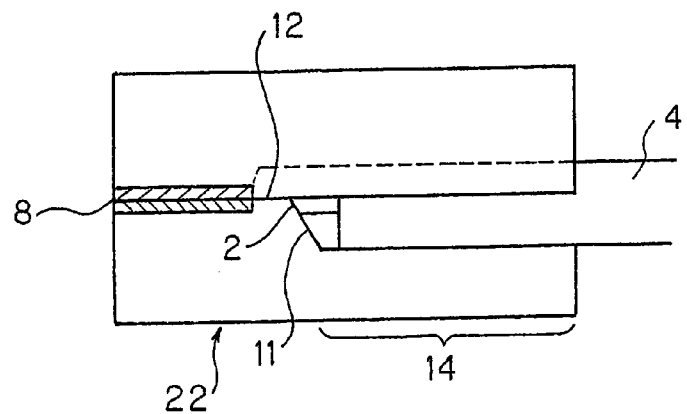

FIGS. 4(a), (b), and (c) show yet another embodiment of a thermally fused integral ferrule according to this invention. FIG. 4(a) is a perspective view, FIG. 4(b) is an exploded perspective view, and FIG. 4(c) is an explanatory sectional drawing showing that optical fibers are inserted into the ferrule (a fiber array).

A thermally fused integral ferrule 22 is obtained by using thermal fusion to unitarily combine a first glass substrate 5 having a covered-optical-fiber support section 14 and optical-fiber fixing V-shaped grooves 9 with a second glass substrate 7 having a covered-optical-fiber fixing groove 13b located above the covered-optical-fiber support section 14 and a void 16 that constitutes an optical-fiber guide section 12 with part of the optical-fiber fixing V-shaped grooves 9 in the first glass substrate 5.

Compared with the thermally fused integral ferrule 1 shown in FIGS. 1(a), (b), (c), and (d), the thermally fused interface 8 between the first and second glass substrates 5 and 7 can be minimized to prevent the V-shaped groove site of the glass substrate 5 accurately formed from being thermally deformed, thereby maintaining the dimensional accuracy of the optical-fiber fixing grooves 9 at the same value as that measured prior to thermal fusion.

In addition, compared with the thermally fused integral ferrule shown in FIGS. 3(a), (b), and (c), the covered-optical-fiber support section 14 and the covered-optical fiber fixing groove 13b form a covered-optical-fiber housing section 15. Thus, if the ferrule 22 is unitarily combined with the covered optical fiber 4 as shown in FIG. 4(c), the optical fibers 2 can be inserted straight into the optical-fiber fixing V-shaped grooves 9 to reliably fix the covered optical fiber 4 to the ferrule 22.

Moreover, this embodiment does not require the covered-optical-fiber housing section 15 to be supersonically processed as in the thermally fused integral ferrule shown in FIGS. 1(a), (b), (c), and (d). In the ferrule structure in FIGS. 4(a), (b), and (c), the first glass substrate 5 has a stepped structure that can be formed by means of grinding, and the second glass substrate 7 has no V-shaped grooves and can be formed easily by means of press molding. Thus, this embodiment is very advantageous in terms of costs.

As described above, the structure of the thermally fused integral ferrule according to this invention is mainly characterized in that the optical-fiber fixing grooves are formed of V-shaped grooves 9 and in that the optical-fiber guide section 12 is provided on a part of the optical-fiber fixing V-shaped grooves 9 (the part in front of the optical-fiber insertion holes 3).

Figure 5:
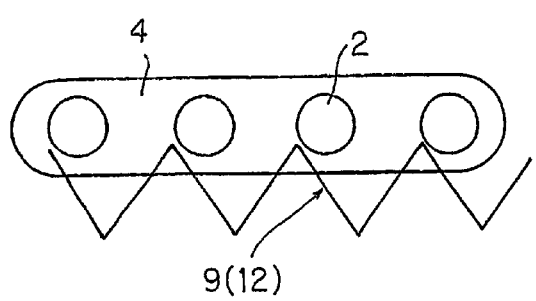
FIGS. 5(a) and (b) is a schematic explanatory drawing showing states in which optical fibers are inserted into an optical-fiber guide section.
FIG. 5(b) shows U-shaped grooves.
Figure 5:
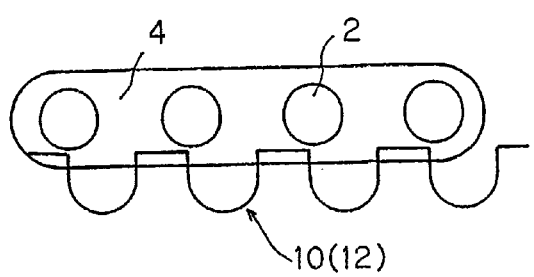

In the thermally fused integral ferrule according to this invention, the optical-fiber fixing grooves are formed of V-shaped grooves 9 (the optical-fiber insertion holes 3 are shaped like triangles), so the angle of the V-shaped grooves 9 can be adjusted to set the opening width of the groove large enough to allow one groove to contact an adjacent groove, as shown in FIG. 5(a). This configuration enables the optical fibers to be inserted more easily.

On the other hand, if the optical-fiber insertion holes are circular, semicircular grooves must be formed in each of the first and second glass substrates and must be aligned accurately. It is very difficult to set a precise clearance for the holes and to achieve alignment without deviating from this clearance.

The optical-fiber fixing V-shaped grooves 9 shown in FIG. 5(a) finally constitute the optical-fiber guide section 12 together with the optical-fiber insertion holes 3 in the thermally fused integral ferrule according to this invention, and are formed in the surface of the first glass substrate 5 by means of grinding.

In addition, if the plurality of optical fibers 2 included in the covered optical fiber 4 are inserted into the thermally fused ferrule using the optical-fiber guide section 12, the optical-fiber fixing grooves 9 are preferably V-shaped (zigzag).

In the case of U-shaped grooves, which are shown in FIG. 5(b), if the optical fibers 2 slip out from the optical-fiber guide section 12, they cannot be inserted into the optical fiber insertion holes 3 easily. In the zigzag V-shaped grooves 9 shown in FIG. 5(a), however, even if the optical fibers 2 slightly slip out, the alignment effect of the V-shaped grooves 9 enables the fibers to be reliably inserted into the optical fiber insertion holes 3.

Figure 6:
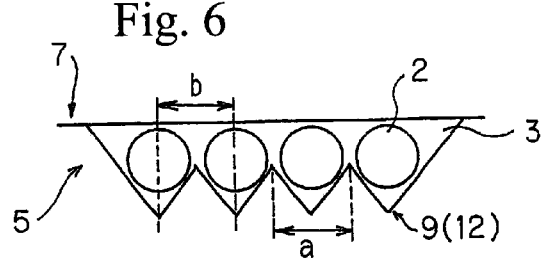
FIG. 6 is a schematic sectional view showing another example (half pitch) of the shape of optical-fiber fixing V-shaped grooves in a thermally fused integral ferrule according to this invention.

Furthermore, by arranging the zigzag V-shaped grooves 9 at a half pitch as shown in FIG. 6, pitch (b) that is as long as groove (a) can be provided that has been difficult to achieve with grooves of different shapes such as circular holes.

This configuration also can prevent the decrease in the strength of the wall surfaces of the V-shaped grooves 9 and the deformation of the V-shaped grooves 9 or damage thereto caused by the thermal fusion of the glass substrates (5 and 7), thereby maintaining the arrangement accuracy and reliability of the optical-fiber fixing V-shaped grooves 9.

Figure 7:
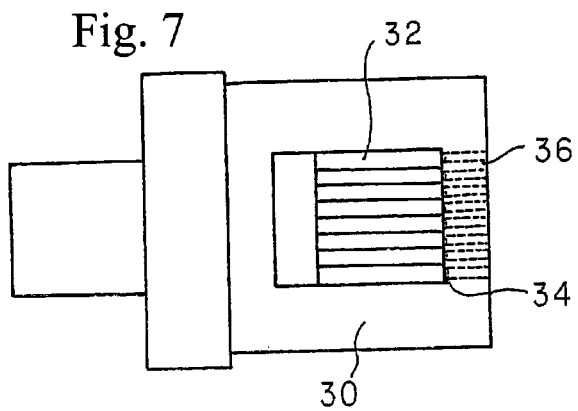
FIG. 7 is a schematic front view showing an example of a conventional MT connector.

Thus, this embodiment does not require precise working for semicircular guide grooves or a conical taper used to insert optical fibers as in the conventional MT connector shown in FIG. 7, thereby reducing costs and improving producibility.

In addition, according to the thermally fused integral ferrule of this invention, the maximum surface roughness (Rmax) of the internal surfaces of the first and second glass substrates 5 and 7 that receive a covered optical fiber and optical fibers is preferably between 0.2 and 2.0 $\mu$m.

If the maximum surface roughness (Rmax) is less than 0.2 $\mu$m, the adhesion strength prior to adhesion cannot be sufficiently maintained. If the maximum surface roughness (Rmax) exceeds 2.0 $\mu$m, the optical fibers are not only likely to be damaged but it is also difficult to maintain the dimensional accuracy.

The internal surfaces of the first and second glass substrates 5 and 7 that receive a covered optical fiber and optical fibers refer to the internal wall surfaces of the covered-optical-fiber housing section and optical-fiber insertion holes.

Next, a method for manufacturing a thermally fused integral ferrule according to this invention is described with reference to FIGS. 1(a), (b), (c), and (d) to 4(a), (b), and (c).

The second glass substrate 7 is placed on the first glass substrate 5 in such a way as to contact it. A load of a predetermined value or higher is applied to the interface between the first and second glass substrates 5 and 7.

In these conditions, the substrates are heated between (Tg1−100)° C. and (Tg2+150)° C. (where Tg1 is the glass transition temperature of one of the first and second glass substrates 5 and 7 that is higher than that of the other and Tg2 is the lower glass transition temperature) for a predetermined period of time. Then, the surfaces of the first and second glass substrates 5 and 7 are activated, and this energy causes them to be joined together. Accordingly, the first glass substrate 5 is unitarily combined with the second glass substrate 7 to form a ferrule.

If the substrates are then heated beyond (Tg2+150)° C., the fiber fixing V-shaped grooves 9 formed in the first glass substrate 5 are softened and deformed, so holes of a predetermined shape cannot be obtained after cooling. In addition, if the substrates are heated under (Tg1−100)° C., the activation of the first and second glass substrates 5 and 7 does not start, so fusion is impossible.

If the first and second glass substrates 5 and 7 comprise, for example, BK-7, thermal fusion is effected at 600° C. because the glass transition temperature of this material is 557° C. If the second glass substrate 7 comprise Mirachron PC-4 manufactured by NGK Insulators, Ltd., thermal fusion can be effected at 530° C. because the glass transition temperature of this material is 498° C.

This is lower than the glass transition temperature (557° C.) of the first glass substrate 5 but is higher than the glass transition temperature (498° C.) of the second glass substrate 7. Thus, the first glass substrate 5 is difficult to fuse, whereas the second glass substrate 7 is easy to fuse, resulting in satisfactory fusion. Furthermore, since this temperature is lower than the glass transition temperature of the first glass substrate 5, it serves to restrain the first glass substrate 5 from being thermally deformed, thereby maintaining the geometrical accuracy of the optical-fiber fixing grooves 9 formed in the first glass substrate 5.

In addition, an alternative method may comprise forming a film of a glass frit on the surface to be thermally fused of the first glass substrate 5 in which the optical-fiber fixing V-shaped grooves 9 are formed or on the surface to be thermally fused of the second glass substrate 7, contacting the surfaces to be thermally fused of the substrates together, and thermally fusing the surfaces at the environmental temperature of (Tg3) to (Tg4+150)° C. (where Tg3 is the glass transition temperature of the glass frit and Tg4 is the glass transition temperature of the first glass substrate 5).

The glass film can be formed by sputtering because the film obtains an even thickness.

This method enables the first or second glass substrate 5 and 7 to be uniformly and firmly joined together all over the junction interface of the glass frit by means of thermal fusion. By setting the glass transition temperature Tg3 of the glass frit lower than Tg4 of the first glass substrate 5, the glass substrates 5 and 7 can be restrained from thermal deformation caused by thermal fusion, thereby improving the dimensional accuracy and reliability of a completed integral ferrule.

If, for example, a glass frit is sputtered onto the surface to be thermally fused of the first or second glass substrate 5 or 7 to form a film of 0.5 μm thickness and if the first and second glass substrates 5 and 7 comprise BK-7, 7570 (glass transition temperature: 350° C.) manufactured by CORNING INCORPORATED that exhibits thermal expansion similar to that of BK-7 and that has a low glass transition temperature can be used to restrain the thermal deformation of the glass substrates 5 and 7 caused by thermal fusion.

No separate load is required if the weight of the second glass substrate 7 acts as a load of a predetermined value or higher.

In addition, either an oxidization or a reduction atmosphere can be used as a heating atmosphere for the fusion of the glass substrates 5 and 7, the heating time is determined as required depending on the material of the substrates, the heating temperature, and the load.

If single-mode fibers are used for the thermally fused integral ferrule according to this invention, the arrangement accuracy is desirably 1 μm or less. To maintain this accuracy, it is important to strictly control deformation caused by thermal fusion and the dimensional accuracy of the optical-fiber fixing V-shaped grooves prior to fusion.

According to this invention, the maximum surface roughness (Rmax) of the surface to be thermally fused of each of the first and second glass substrates 5 and 7 is preferably set at 0.5 μm or less because such roughness reduces the amount of displacement during thermal fusion.

The amount of displacement depends on the environment temperature, the load, the time required for junction, and the surface roughness of the first and second glass substrates.

In addition, the thermally fused integral ferrule according to this invention does not require the entire contact portion between the first and second glass substrates 5 and 7 to be thermally fused. The thermally diffused area is preferably minimized unless the junction strength or watertightness is adversely affected because this minimization enables the dimensions to be controlled easily and also enables the dimensional accuracy of the optical-fiber fixing V-shaped grooves 9 to be maintained. That is, reliability can be maintained if the area of the thermally fused interface between the first and second glass substrates 5 and 7 is 0.01 mm$^2$ or more in total.

Next, a method for manufacturing a fiber array that uses the above thermally fused integral ferrule is described.

Referencing FIGS. 4(a), (b), and (c), the tips of optical fibers 2 are arranged over the guide section 12 on the optical-fiber fixing V-shaped grooves 9 in the thermally fused integral ferrule 22 (step (a)), and the tips of the optical fibers 2 are lowered onto the optical-fiber fixing V-shaped grooves 9 (step (b)).

Then, the optical fibers 2 and the covered optical fibers 4 are inserted into the thermally fused integral ferrule 22 (the covered optical fiber housing section 15) while the optical-fiber fixing V-shaped grooves 9 is being allowed to guide the tips of the fibers 2 (step (c)).

Next, a sufficient amount of a first liquid adhesive is applied to and filled in the entire thermally fused integral ferrule 22 into which the optical fibers 2 and the covered-optical fiber 4 has been inserted (step (d)). Finally, the first liquid adhesive was solidified (step (e)) to manufacture a fiber array.

If a fiber array is manufactured that uses a thermally fused integral ferrule wherein the second glass substrate 7 is configured in such a way that there is an open space over the guide section 12 on the optical-fiber fixing V-shaped grooves 9 in the first glass substrate 5 while only the optical-fiber fixing V-shaped grooves 9 are covered, then after step (e), it is necessary to cover the guide section 12 and the covered optical fiber 4 with a second liquid adhesive 19 (step (f)) and to solidify the second liquid adhesive (step (g)).

The first and second liquid adhesives may be of the same type or different types.

In addition, prior to step (a), the first liquid adhesive may be applied beforehand to the optical-fiber fixing V-shaped grooves 9 in the first glass substrate 5 or to the optical fibers 2.

The method for manufacturing the thermally fused integral ferrule according to this invention and the fiber array that uses this ferrule is described below in detail.

V-shaped grooves are formed in a 50-mm-square glass wafer (BK-7) for 7 groups of fibers each including 16 fibers (112 fibers in total). The V-shaped grooves may be formed by means of grinding or pressing. Next, the covered-optical-fiber fixing groove constituting the covered-optical-fiber housing section of the thermally fused integral ferrule, or the covered-optical-fiber support section that is a step portion is formed. The covered-optical-fiber fixing groove (FIGS. 1(a), (b), (c), and (d) and 2(a) and (b)) is supersonically formed, or the covered-optical-fiber support section (FIGS. 3(a), (b), and (c) and 4(a), (b), and (c)) is formed by means of grinding. Thus, the first glass substrate is obtained.

The covered-optical-fiber fixing groove (FIGS. 1(a), (b), (c), and (d), 2(a) and (b), and 4(a), (b), and (c)) is similarly formed in a 50-mm-square glass wafer (BK-7) by means of pressing. The second glass substrate shown in FIGS. 3(a), (b), and (c) has no covered-optical-fiber fixing groove and can be formed by simple grinding.

Next, the second glass substrate is contacted with the first glass substrate, and a load of a predetermined value or higher is applied to the interface between the first and second glass substrates while the interface is thermally fused at 600° C. because the glass transition temperature of BK-7 is 557° C.

When Mirachron PC-4 manufactured by NGK Insulators, Ltd. is used as the second glass substrate, thermal fusion is carried out at 530° C. because its glass transition temperature is 498° C.

When a glass frit is used for thermal fusion, it is sputtered onto the surface to be thermally fused of each of the first and second glass substrates to form a film of 0.5 μm thickness. The glass frit comprises 7570 (glass transition temperature: about 350° C.) manufactured by CORNING INCORPORATED that exhibits thermal expansion similar to that of BK-7 and that has a lower melting point than BK-7.

After the first and second glass substrates are thermally fused as described above, a dicer is used to cut this wafer into chips to provide a thermally fused integral ferrule.

Next, a fiber array is manufactured using the thermally fused integral ferrule obtained.

The tips of the optical fibers are inserted into the guide section on the optical-fiber fixing V-shaped groove in the thermally fused integral ferrule. Then, the optical fibers and the covered-optical-fiber are inserted into the thermally fused integral ferrule while the tips of the optical fibers are being moved along the optical-fiber fixing V-shaped grooves. Next, a sufficient amount of the first liquid adhesive is filled in the gap in the thermally fused integral ferrule for solidification, with the optical fibers and the covered optical fibers already inserted into the ferrule. Finally, the end surface is optically polished to complete a fiber array.

By applying the first liquid adhesive to the optical fibers beforehand and then inserting the fibers into the thermally fused integral ferrule, the alignment effect can be reliably provided to reduce the possibility that the optical fiber may be damaged by the edge of the V-shaped groove.

As described above, this invention provides an inexpensive ferrule that has high junction strength, watertightness, and productivity, and its manufacturing method, as well as a fiber array manufacturing method.

What is claimed is:

1. A thermally fused integral ferrule in which a first glass substrate is at least partly combined with a second glass substrate unitarily by means of thermal fusion, wherein: said first glass substrate includes optical-fiber fixing V-shaped grooves on a surface opposed to the second glass substrate, and wherein:
said first glass substrate also includes a guide section positioned on the optical-fiber fixing V-shaped grooves in said first glass substrate, said guide section comprising a void between the first and second glass substrates.

2. A thermally fused ferrule according to claim 1 wherein the maximum surface roughness (Rmax) of the internal surfaces of the first and second glass substrates is between 0.2 and 2.0 μm.

3. A thermally fused ferrule according to claim 1 wherein the area of the surface to be thermally fused of each of said first and second glass substrates is 0.01 mm² or more.

4. A thermally fused ferrule according to claim 1, wherein the whole contact surfaces of the first glass substrate excluding a covered-optical-fiber fixing groove and the second glass substrate are thermally fused.

5. A thermally fused ferrule according to claim 1, wherein said guide section is provided with a taper.

6. A thermally fused ferrule according to claim 1, wherein the first glass substrate having a covered-optical-fiber support section and an optical-fiber fixing groove is unitarily combined with the second glass substrate having an open portion to compose said guide section together with a part of said optical-fiber fixing groove of the first glass substrate by thermal fusion.

7. A thermally fused ferrule according to claim 1, wherein the first glass substrate having a covered-optical-fiber support section and an optical-fiber fixing groove is unitarily combined with the second glass substrate having a gap to compose said guide section together with a covered-optical-fiber fixing groove located over a covered-optical-fiber support section of the first glass substrate and a part of said optical-fiber fixing groove of the first glass substrate by thermal fusion.

8. A method for manufacturing a thermally fused integral ferrule, comprising: contacting a surface to be thermally fused of a first glass substrate in which optical-fiber fixing V-shaped grooves are formed with a surface to be thermally fused of a second glass substrate, and thermally fusing said surfaces of the first and second glass substrates at a temperature of (Tg1−100) to (Tg2+150)° C., wherein Tg1 is the glass transition temperature of one of the first and second glass substrates that is higher than that of the other, and Tg2 is the lower glass transition temperature.

9. A method for manufacturing a thermally fused integral ferrule according to claim 8, wherein the maximum surface roughness (Rmax) of the surface to be thermally fused of each of the first and second glass substrates is 0.5 μm or less.

10. A method for manufacturing a thermally fused integral ferrule, comprising: forming a film of a glass frit on a surface to be thermally fused of a first glass substrate in which optical-fiber fixing V-shaped grooves are formed or on a surface to be thermally fused of a second glass substrate, contacting the surfaces of the glass substrates together, and thermally fusing the surfaces of said glass substrates at a temperature of (Tg3) to (Tg4+150)° C., wherein Tg3 is the glass transition temperature of the glass frit and Tg4 is the glass transition temperature of the first glass substrate.

11. A method for manufacturing a thermally fused integral ferrule according to claim 10, wherein the maximum surface roughness (Rmax) of the surface to be thermally fused of each of the first and second glass substrates is 0.5 μm or less.

* * * * *